United States Patent
Yang et al.

[11] Patent Number: 6,157,684
[45] Date of Patent: Dec. 5, 2000

[54] ONE BIT MATCHED FILTER WITH LOW COMPLEXITY AND HIGH SPEED

[75] Inventors: Lin Yang, Fremont; Yan Zhong, Santa Clara; Manouchehr S. Rafie, Sunnyvale, all of Calif.

[73] Assignee: Cadence Design Systems, Inc., San Jose, Calif.

[21] Appl. No.: 09/172,973

[22] Filed: Oct. 14, 1998

[51] Int. Cl.$^7$ .................................................. H04L 27/06
[52] U.S. Cl. ........................................... 375/343; 708/422
[58] Field of Search .................................. 375/142, 143, 375/150, 152, 343; 708/422, 426

[56] References Cited

U.S. PATENT DOCUMENTS 4,989,009  1/1991  Zerkowitz .
5,239,496  8/1993  Vancraeynest .
5,684,727  11/1997 Campbell et al. ...................... 708/422

FOREIGN PATENT DOCUMENTS

2315647  2/1998  United Kingdom .

*Primary Examiner*—Don N. Vo
*Attorney, Agent, or Firm*—Ying Tuo; Crosby, Heafey, Roach & May

[57] ABSTRACT

Described is an one bit matched filter for generating a sequences of correlations between a signal bit stream and a sample stream of n sample bits. The n sample bits are arranged in a rang of n bit positions n, n−1, ..., 2, 1. Among the n sample bits, m boundary positions are defined based on the bit pattern of the sample stream, where m<n. At a specific time T(k), the m boundary positions are used to generate a Contribution (k) for a section of signal bits that are shifted into the n bit positions. At the time T(k), a Correlation (k) is generated by adding the Contribution (k) with the Correlation (k−1) that was generated at the previous time T(k−1).

28 Claims, 8 Drawing Sheets

| | | | 10 | 9 | 8 | 7 | 6 | 5 | 4 | 3 | 2 | 1 | TOTAL CONTRIBUTION |
|---|---|---|---|---|---|---|---|---|---|---|---|---|---|
| | BIT POSITION FOR SAMPLE BITS | | 10 | 9 | 8 | 7 | 6 | 5 | 4 | 3 | 2 | 1 | |
| | SAMPLE BITS | | 0 | 0 | 0 | 1 | 1 | 1 | 1 | 0 | 0 | 0 | |
| 301 | BIT 1 | TIME 1 →0 | | | | | | | | | | | |
| | | TIME 4 | | | | →0 | | | | | | | |
| | | TIME 8 | | | | | | | →0 | | | | |
| | | TIME 10 | | | | | | | | | →0 | | |
| | | CONTRIBUTION | 1 | | | -1 | | | | +1 | | | 1 |
| 302 | BIT 2 | TIME 2 →1 | | | | | | | | | | | |
| | | TIME 5 | | | | →1 | | | | | | | |
| | | TIME 9 | | | | | | | →1 | | | | |
| | | TIME 10 | | | | | | | | | →1 | | |
| | | CONTRIBUTION | 0 | | | 1 | | | | -1 | | | 0 |
| 303 | BIT 3 | TIME 3 →1 | | | | | | | | | | | |
| | | TIME 6 | | | | →1 | | | | | | | |
| | | TIME 10 | | | | | | | →1 | | | | |
| | | CONTRIBUTION | 0 | | | 1 | | | | -1 | | | 0 |
| 304 | BIT 4 | TIME 4 →1 | | | | | | | | | | | |
| | | TIME 7 | | | | →1 | | | | | | | |
| | | TIME 10 | | | | | | →1 | | | | | |
| | | CONTRIBUTION | 0 | | | 1 | | | | | | | 1 |
| 305 | BIT 5 | TIME 5 →1 | | | | | | | | | | | |
| | | TIME 8 | | | | →1 | | | | | | | |
| | | TIME 10 | | | | | →1 | | | | | | |
| | | CONTRIBUTION | 0 | | | 1 | | | | | | | 1 |
| 306 | BIT 6 | TIME 6 →0 | | | | | | | | | | | |
| | | TIME 9 | | | | →0 | | | | | | | |
| | | TIME 10 | | | | | →0 | | | | | | |
| | | CONTRIBUTION | 1 | | | -1 | | | | | | | 0 |
| 307 | BIT 7 | TIME 7 →0 | | | | | | | | | | | |
| | | TIME 10 | | | | →0 | | | | | | | |
| | | CONTRIBUTION | 0 | | | -1 | | | | | | | 0 |
| 308 | BIT 8 | TIME 8 →0 | | | | | | | | | | | |
| | | TIME 10 | | | →0 | | | | | | | | |
| | | CONTRIBUTION | 1 | | | | | | | | | | 1 |
| 309 | BIT 9 | TIME 9 →1 | | | | | | | | | | | |
| | | TIME 10 | | →1 | | | | | | | | | |
| | | CONTRIBUTION | 0 | | | | | | | | | | 0 |
| 310 | BIT 10 | TIME 10 →1 | | | | | | | | | | | |
| | | CONTRIBUTION | 0 | | | | | | | | | | 0 |
| | | | | | | | | | | | | | 4 (322) |

FIG. 3

|  | b(1)=$P_{10}$ | | | b(2)=$P_7$ | | | | b(3)=$P_3$ | | | b(4)=$P_0$ |
|---|---|---|---|---|---|---|---|---|---|---|---|
| BIT POSITIONS | 10 | 9 | 8 | 7 | 6 | 5 | 4 | 3 | 2 | 1 | 0 |
| SAMPLE BITS | 0 | 0 | 0 | 1 | 1 | 1 | 1 | 0 | 0 | 0 | 1 |

FIG. 4

| INPUTS AT BOUNDARY POSITIONS | | | | VALUES AT BOUNDARY POSITIONS | | | | CONTRIBUTIONS |
|---|---|---|---|---|---|---|---|---|
| $P_{10}$ | $P_7$ | $P_3$ | $P_0$ | $P_{10}$ | $P_7$ | $P_3$ | $P_0$ | |
| 0 | 0→1 | 1→0 | 0→1 | 0 | 0→1 | 1→0 | 0→1 | |
| 0 | 0 | 0 | 0 | +1 | -1 | +1 | -1 | 0 |
| 0 | 0 | 0 | 1 | +1 | -1 | +1 | 0 | +1 |
| 0 | 0 | 1 | 0 | +1 | -1 | -1 | -1 | -2 |
| 0 | 0 | 1 | 1 | +1 | -1 | -1 | 0 | -1 |
| 0 | 1 | 0 | 0 | +1 | +1 | +1 | -1 | +2 |
| 0 | 1 | 0 | 1 | +1 | +1 | +1 | 0 | +3 |
| 0 | 1 | 1 | 0 | +1 | +1 | -1 | -1 | 0 |
| 0 | 1 | 1 | 1 | +1 | +1 | -1 | 0 | +1 |
| 1 | 0 | 0 | 0 | 0 | -1 | +1 | -1 | -1 |
| 1 | 0 | 0 | 1 | 0 | -1 | +1 | 0 | 0 |
| 1 | 0 | 1 | 0 | 0 | -1 | -1 | -1 | -3 |
| 1 | 0 | 1 | 1 | 0 | -1 | -1 | 0 | -2 |
| 1 | 1 | 0 | 0 | 0 | +1 | +1 | -1 | +1 |
| 1 | 1 | 0 | 1 | 0 | +1 | +1 | 0 | +2 |
| 1 | 1 | 1 | 0 | 0 | +1 | -1 | -1 | -1 |
| 1 | 1 | 1 | 1 | 0 | +1 | -1 | 0 | 0 |

| INPUTS AT BOUNDARY POSITIONS | | VALUES AT BOUNDARY POSITIONS | | CONTRIBUTIONS |
|---|---|---|---|---|
| $P_{17}$ | $P_{13}$ | $P_{17}$ | $P_{13}$ | |
| 0→1 | 1→0 | 0→1 | 1→0 | |
| 0 | 0 | -1 | +1 | 0 |
| 0 | 1 | -1 | -1 | -2 |
| 1 | 0 | +1 | +1 | 2 |
| 1 | 1 | +1 | -1 | 0 |

FIG. 8

| INPUTS AT BOUNDARY POSITIONS | | VALUES AT BOUNDARY POSITIONS | | CONTRIBUTIONS |
|---|---|---|---|---|
| $P_{10}$ | $P_7$ | $P_{10}$ | $P_7$ | |
| 0→1 | 1→0 | 0→1 | 1→0 | |
| 0 | 0 | -1 | +1 | 0 |
| 0 | 1 | -1 | -1 | -2 |
| 1 | 0 | +1 | +1 | 2 |
| 1 | 1 | +1 | -1 | 0 |

FIG. 9

| INPUTS AT BOUNDARY POSITIONS | | | CONTRIBUTIONS AT BOUNDARY POSITIONS | | | CONTRIBUTION |
|---|---|---|---|---|---|---|
| $P_{20}$ | $P_4$ | $P_0$ | $P_{20}$ | $P_4$ | $P_0$ | |
| 0 | 0→1 | 1→0 | 0 | 0→1 | 1→0 | |
| 0 | 0 | 0 | +1 | -1 | 0 | 0 |
| 0 | 0 | 1 | +1 | -1 | -1 | -1 |
| 0 | 1 | 0 | +1 | +1 | 0 | +2 |
| 0 | 1 | 1 | +1 | +1 | -1 | +1 |
| 1 | 0 | 0 | 0 | -1 | 0 | -1 |
| 1 | 0 | 1 | 0 | -1 | -1 | -2 |
| 1 | 1 | 0 | 0 | +1 | 0 | +1 |
| 1 | 1 | 1 | 0 | +1 | -1 | 0 |

ONE BIT MATCHED FILTER WITH LOW COMPLEXITY AND HIGH SPEED

FIELD OF THE INVENTION

The present invention relates generally to a matched filter, and more specifically to an one bit matched filter for generating a sequence of correlations for each of the signal bits in a signal bit stream in comparison to a sample bit stream.

BACKGROUND OF THE INVENTION

To identify a signal stream being transmitted to a receiver, many digital communication systems use matched filters to detect a section of the bit stream having a unique bit pattern, so that the receiver can selectively receive and process the signal streams associated with the unique pattern.

As one example, in a Code Division Multiple Access (CDMA) communication system, the signal streams from each cellular telephone are coded and transmitted together with the signal streams from other cellular telephones over a very wide bandwidth. All cellular telephones in a CDMA communication system differentiate themselves from one another using a pseudo-random code. A particular pseudo-random code allows a receiver to access the signal streams that are sent to it. A matched filter can be used to detect a particular pseudo-random code for a respective cellular telephone receiver.

As another example, in many communication systems, each message is divided into frames before transmission to a receiver. For synchronization, each frame contains a preamble having a unique bit pattern. A matched filter detects the unique bit pattern, and the receiver can start to receive and process the frame once the preamble is detected.

Figure 1:
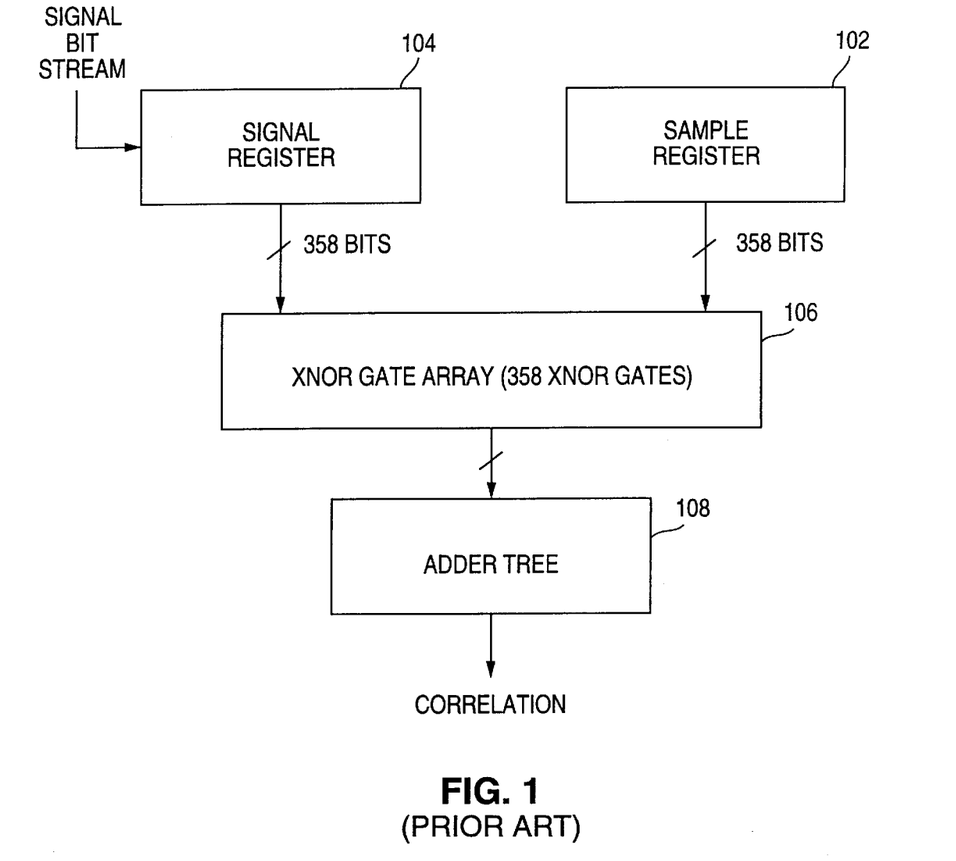
FIG. 1 shows a conventional matched filter.

FIG. 1 shows a conventional match filter including a sample register 102 for storing a sample stream of 358 bits, a signal register 104 for storing a signal stream of 358 bits, an array 106 consisting of 358 XNOR gates, and an adder tree 108. Each of the XNOR gates receives a respective sample bit from the sample pattern register 102 and a respective signal bit from the signal register 104. The array 106 compares the 358 signal bits from the signal register 102 with the respective sample bits from the sample register 104, to determine how many signal bits in the signal register 104 are identical to the sample bits in sample register 102. Specifically, an XNOR gate generates a value 1, if the received signal bit is the same as the received sample bit, and generates a value 0, if the received signal bit is different from the received sample bit. The array 106 feeds the 358 comparison result bits to the adder tree 108. By adding the 358 comparison result bits together, the adder tree 108 generates a correlation. The signal bits in the signal register 104 match the sample bits in the sample register 102 if the correlation is greater than or equal to a threshold value. The signal bits in the signal register 104 do not match the sample bits in the sample register 102 if the correlation is less than the threshold value.

Unfortunately, the conventional matched filter has some shortcomings. To generate a correlation between a signal stream section and a sample stream of n bits, the conventional matched filter requires n XNOR gates. If n is a large number, the adder tree must be divided into many layers. For example, the matched filter shown in FIG. 1 requires 358 XNOR gates. If the adder tree 108 uses a 3-bit-input full adder as basic building blocks, it comprises 8 layers with each layer having 178, 89, 44, 22, 11, 5, 2, and 1 full adders, respectively. Also disadvantageous is that the conventional matched filter has a complex hardware structure, entailing high cost but providing low speed.

There is, therefore, a need for an improved apparatus and method for generating a sequence of correlations for each of the signal bits in a signal bit stream in comparison to a sample bit stream, the apparatus and method being characterized by low complexity and high speed.

There is also a need for low cost apparatus and method to generate a sequence of correlations for each of the signal bits in a signal bit stream in comparison to a sample bit stream.

The present invention provides the methods and apparatus to meet these needs.

SUMMARY OF THE INVENTION

To address the shortcomings of the prior art, the present invention provides a novel apparatus and method to generate a sequence of correlations for each of the signal bits in a signal bit stream over a sample bit stream.

In one aspect, the present invention provides an apparatus for generating a correlation between a sample bit stream of n sample bits An, An−1, . . . , A1 and a section of a signal bit stream. The apparatus comprises:

(a) a register, having n bit positions n, n−1, . . . , 1, wherein the bit position n defines an end bit position and the bit position 1 defines a start bit position, wherein the n bit positions have m boundary positions Ab1, Ab2, . . . , Abm defined by the bit pattern of the sample bit stream, wherein the register shifts the n bits stored in the register one bit in a direction towards the start bit position at time T(k), so that the register stores the signal bit in the end bit position;

(b) a circuit for generating a Contribution (k) at time T(k); and (c) a circuit for generating a correlation C(k) by adding the Contribution (k) with a correlation C(k−1) generated at T(k−1).

In another aspect, the present invention provides a method for generating a sequence of correlations for each of the signal bits in a signal stream over a sample bit stream of n sample bits An, An−1, . . . , A1. The method comprises the steps of:

arranging the n sample bits An, An−1, . . . , A1 in n bit positions n, n−1, . . . , 1, respectively;

storing n signal bits Dn, Dn−1, . . . , D1 in the n bit positions n, n−1, . . . , 1, respectively, wherein the bit position n defines an end bit position and the bit position 1 defines a start bit position;

identifying m boundary positions Ab1, Ab2, . . . , Abm from the n sample bits arranged in the n bit positions;

at a time T(k), shifting the signal bits Dn, Dn−1, . . . , D1 one bit in a direction towards the start bit position so that a newly coming signal bit is shifted into the end bit position;

at the time T(k), generating a Contribution (k) based on signal bits that are shifted into the m boundary positions; and at the time T(K), generating a correlation C(k) by adding Contribution (k) generated at T(k) with a correlation C(k−1) generated at T(k−1).

BRIEF DESCRIPTION OF THE DRAWING

The aforementioned advantages of the present invention as well as additional advantages thereof will be more clearly understood hereinafter as a result of a detailed description of the embodiments of the invention, taken in conjunction with the following drawings in which.

DETAILED DESCRIPTION OF PREFERRED EMBODIMENTS

To overcome the shortcomings of the available art, the present invention provides novel apparatuses and methods for generating a sequences of correlations between a sample bit stream and a signal bit stream.

Figure 2:
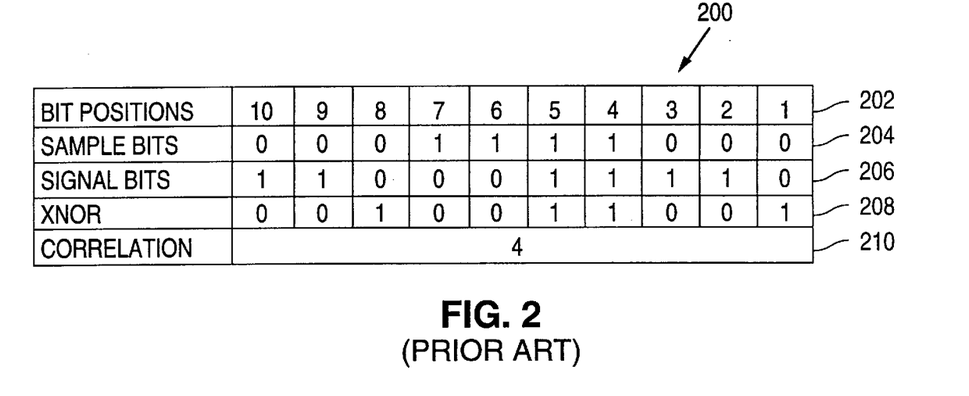
FIG. 2 shows a table, illustrating a conventional method of generating a correlation between a sample bit stream and a signal bit stream.

Referring to FIG. 2, there is shown a table 200, illustrating a conventional method of generating a correlation between a sample bit stream of ten bits and a signal bit stream of ten bits.

As shown in FIG. 2, the table 200 has a bit position row 202 containing ten bit positions, numbered as: 10, 9, . . . , 1; a sample bit row 204 containing ten sample bits; a signal bit row 206 containing ten signal bits; an XNOR operation row 208 showing ten XNOR operation results for ten respective bit positions; and a correlation row 210 showing a value of the correlation between the sample bits and the signal bits. As shown in row 208, an XNOR operation generates a "1" for a bit position, if the sample bit and signal bit at that bit position are the same; XNOR operation generates a "0" for a bit position, if the sample bit and signal bit at that bit position are different. Since the signal bits in bit positions 8, 5, 4 and 1 are equal to the sample bits in the respective bit positions, the XNOR operation row 208 generates four "1s". Adding the XNOR operation at bit positions 8, 5, 4, and 1, the value in the correlation row 210 is four.

The matched filter 100 shown in FIG. 1 is designed according to the conventional specifications illustrated in FIG. 2. The conventional method requires an XNOR gate for every sample bit, because each signal bit in a signal stream is separately compared with a respective sample bit in a sample stream, thus entailing high hardware cost and providing low speed.

To overcome the shortcomings of the conventional method, the present invention arranges a sample bit stream of n bits in a range of n bit positions, numbered as: n, n−1, . . . , 2, 1, and constantly adjusts to correlate for: (1) a signal bit shifted into bit position n, (2) a signal bit shifted out of bit position 1, and (3) signal bits shifted within the range of n bit positions.

Figure 3:
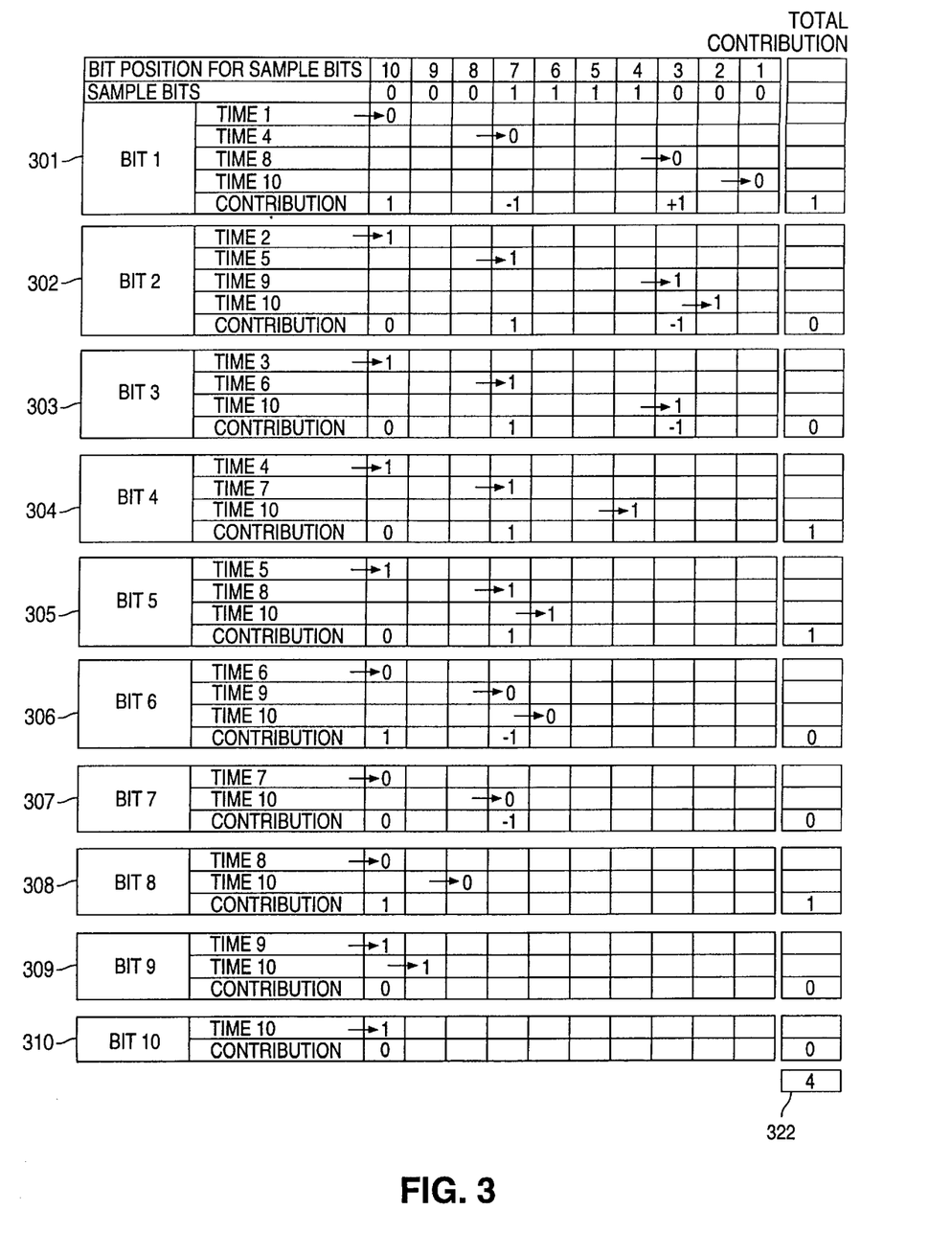
FIG. 3 shows ten tables, illustrating the correlation contributions while the ten signal bits in the signal bit stream shown in FIG. 2 are shifted into their respective positions, in accordance with the present invention.

Referring to FIG. 3, there is shown a conceptual scheme of the present invention.

FIG. 3 contains ten tables 301–310, illustrating the contributions of the ten signal bits {1100011110} comparing the ten sample bits {0001111000}. In FIG. 3, the ten sample bits {0001111000} are arranged in ten bit positions 10, 9, . . . , 2, 1, respectively. A correlation between the ten signal bits and the ten sample bits is generated after the ten signal bits are incrementally shifted to their respective bit positions at a sequence of times 1–10.

Table 301 illustrates a process of generating a contribution for signal bit 1, in which signal bit 1 ("0") is compared with the sample bits while it is shifted from bit position 10 to bit position 1 in the time sequence of times 1–10.

At time 1, signal bit 1 ("0") is shifted into bit position 10. Since the sample bit 10 is the same as signal bit 1, the contribution of signal bit 1 at time 1 is 1. Table 301 does not show the contributions for signal bit 1 at times 2 and 3, since sample bits 9 and 8 are all "0s", and the contributions for the signal bit 1 will not change at times 2 and 3. Note that if the sample bits at bit positions 1–9 were all "0s", the contribution for signal bit 1 from times 1–10 would be determined at time 1, because the contribution value will not change for signal bit 1 at sample bits 1–9. However, if there are any bit pattern changes (from 0 to 1 or from 1 to 0) in sample bits 1–9, the contribution for signal bit 1 should be adjusted.

At time 4, signal bit 1 ("0") is shifted into bit position 7. Since there is a bit pattern transition between sample bits 8 and 7, the contribution for the signal bit 1 at time 4 is −1 to offset the contribution at time 1. Table 301 does not show the contributions for the signal bit 1 at times 5, 6, and 7, since the sample bits 6, 5 and 4 are all "1s", and the contributions for the signal bit 1 will not change at times 5, 6, and 7. Note that if sample bits 1–6 were all "1s", the contribution for signal bit 1 from times 1–10 would be determined at time 4, because the contribution value will not change the contribution for signal bit 1 at bit positions 1–6. However, if there are any bit pattern changes (from 0 to 1 or from 1 to 0) in sample bits 1–6, the contribution for signal bit 1 should be adjusted.

At time 8, the signal bit 1 ("0") is shifted into bit position 3. Since there is a bit pattern transition between sample bits 4 and 3, the contribution for signal bit 1 at time 8 is 1 again. Table 301 does not show the contributions for the signal bit 1 at time 9, since the sample bit 2 is "0", and the contribution for the signal bit 1 will not change at time 9.

At time 10, the signal bit 1 (a "0") is shifted into bit position 1. Since sample bit 1 is "0", it requires no contribution adjustments for signal bit 1 at time 10.

As indicated in column 322, the final contribution for signal bit 1 can be generated by adding the contributions at times 1, 4, and 8 (1=1−1+1).

Table 302 shows a process of generating a correlation contribution for signal bit 2, in which the signal bit 2 ("1")

is compared with the sample bits while it is shifted from bit position 10 to bit position 2 in the time sequence of times 1–10.

At time 2, the signal bit 2 ("1") is shifted into bit position 10. Since signal bit 2 is different from sample bit 10, the contribution of signal bit 2 at time 2 is 0. Table 301 does not show the contributions for the signal bit 2 at times 3 and 4, since the sample bits 9 and 8 are all "0s", and the contributions for the signal bit 2 will not change at times 3 and 4. Note that if the positions 2–9 were all "0s", the contribution for signal bit 2 would be determined at time 2, because the contribution value will not change for signal bit 2 at bit positions 2–9. However, if there are any bit pattern changes (from 0 to 1 or from 1 to 0) in bit positions 2–9, the contribution for signal bit 2 should be adjusted.

At time 5, signal bit 2 ("1") is shifted into bit position 7. Since there is a bit pattern transition between sample bits 8 and 7, the contribution for signal bit 1 at time 5 is 1. Table 302 does not show the contributions for signal bit 2 at times 6, 7, and 8, since the sample bits 6, 5 and 4 are all "1s", and the contributions for signal bit 2 will not change at times 6, 7, and 8. Note that if sample bits 1–6 were all "1s", the contribution for signal bit 2 would be determined at time 5, because the contribution value will not change the contribution for signal bit 2 at sample bits 1–6. However, if there are any bit pattern changes (from 0 to 1 or from 1 to 0) in the sample bits 1–6, the contribution for signal bit 2 should be adjusted.

At time 9, signal bit 2 ("1") is shifted into bit position 3. Since there is a bit pattern transition between bit positions 4 and 3, the contribution for signal bit 2 at time 8 is –1 to offset the contribution at time 7.

At time 10, the signal bit 2 ("1") is shifted into bit position 2. Since bit position 2 is "0", it requires no contribution adjustments for signal bit 2 at time 10.

As indicated in column 322, the final contribution for signal bit 2 can be generated by adding the contributions at times 4 and 8 (0=1–1).

Table 303 illustrates a process of generating a contribution for signal bit 3, in which the signal bit 3 ("1") is compared with the sample bits while it is shifted from bit position 10 to bit position 3 in the sequence of times 1–10.

Table 304 shows a process of generating a contribution for signal bit 4, in which the signal bit 1 ("1") is compared with the sample bits while it is shifted from bit position 10 to bit position 4 in the sequence of times 1–10.

Table 305 shows a process of generating a contribution for signal bit 5, in which the signal bit 5 ("1") is compared with the sample bits while it is shifted from bit position 10 to bit position 5 in the sequence of times 1–10.

Table 306 shows a process of generating a contribution for signal bit 6, in which the signal bit 6 ("0") is compared with the sample bits while it is shifted from bit position 10 to bit position 6 in the sequence of times 1–10.

Table 307 shows a process of generating a contribution for signal bit 7, in which the signal bit 7 ("0") is compared with the sample bits while it is shifted from bit position 10 to bit position 7 in the sequence of times 1–10.

Table 308 shows a process of generating a contribution for signal bit 8, in which the signal bit 8 ("0") is compared with the sample bits while it is shifted from bit position 10 to bit position 8 in the sequence of times 1–10.

Table 309 shows a process of generating a contribution for signal bit 9, in which the signal bit 9 ("1") is compared with the sample bits while it is shifted from bit position 10 to bit position 9 in the sequence of times 1–10.

Table 310 shows a process of generating a contribution for signal bit 10, in which the signal bit 10 ("1") is compared with the sample bit 10 while it is shifted into bit position 10 in the sequence of times 1–10.

The processes of generating contributions for sample bits 3–10 shown in tables 303–310 are similar to the descriptions in connection with either of table 301 or 302.

As shown in the column 322 of FIG. 3, the correlation between the 10 signal bits {1100011110} and the ten sample bits {0001111000} can be generated by adding all contributions for the ten signal bits at time 10. Specifically, the correlation between the ten signal bits {1100011110} and the ten sample bits {0001111000} is 4=(1+0+0+1+1+0+0+1+0+0). Viewed another way, the correlation for the ten signal bits is already partially generated at each time (i), i=1, 2, ..., 10. Instead of adding all the contributions for the ten signal bits at time 10, correlation for the ten signal bits can be partially recorded each time when the ten signal bits are shifted one bit position in a direction towards their respective bit positions. The correlation at time (i) may need to be adjusted at time (i+1) by combining the correlation adjustment (or contribution) for the ten signal bits at time (i+1) when the ten signal bits are further shifted towards their respective bit positions. Thus, the correlation at time 10 becomes the correlation for the ten signal bits at time 9 plus the correlation adjustment for the ten signal bits at time 10.

Analyzing the process shown in FIG. 3, when a signal bit is shifted from the last bit position to its respective bit position, the contributions for the signal bit can occur in two types of boundary positions: (1) the last bit position in the sample stream, and (2) the bit position in the sample stream where the bit pattern changes (from 0 to 1 or from 1 to 0).

It should be noted that FIG. 3 treats the signal stream {1100011110} in a static manner. That is, it assumes the signal stream had the same bit length as that of the sample stream. Under this assumption, only one correlation is generated when the ten signal bits are all shifted to their respective bit positions in the sequence of times 1–10. Such an assumption simplifies the explanation of the conceptual scheme of the present invention. However, in a real situation, a signal stream has a bit length much greater than that of a sample stream. Assuming that a sample stream has n sample bits that are arranged in a range of bit positions n, n–1, ..., 2, 1, when a signal bit in the signal stream is shifted into bit position n, the signal bit previously located at bit position 1 is shifted out of the range of the n bit positions. In fact, a correlation is generated at each time when a signal bit is shifted into the bit position n and the signal bit located at the bit position 1 is shifted out of the bit position 1. In FIG. 3, there may be many signal bits preceding the signal bit 1 and many signal bits trailing signal bit 10. In actual practice, ten correlations may be generated in the sequence of times 1–10 when the ten signal bits {1100001110} are shifted into bit positions 10, 9, ..., 1, respectively. Thus, when the signal bit 1 is shifted out of the bit position 1 after time 10 (i.e. at time 11), the contribution for the signal bit 1 should be adjusted. Following the same principle, when signal bits 2–10 are shifted out of the bit position 1 at times 12–20 respectively, the contributions for the signal bits 2–10 should also be adjusted accordingly.

Thus, the present invention sets an extended bit position 0 (P0) adjacent to the bit position 1 (P1) as a third type of boundary position, at which the contribution for the signal bit previously located at bit position 1 is adjusted when the signal bit is shifted into bit position 0. The value of the extended bit position 0 can be the same with that of bit position 1, or be opposite to that of the bit position 1. The present invention arranges a sample stream of n bits in a range of n bit positions: n, n−1, . . . , 2, 1 (or Pn, Pn−1, . . . , P2, P1), respectively; and defines three types of boundary positions based on the bit pattern of the sample stream. At a specific time while a signal bit is shifted into these three types of boundary positions, the contribution adjustment for the signal bit can be determined by the following rules:

(1) at the last bit position n (Pn), if the signal bit is the same as the last sample bit, the contribution is 1; if the signal bit is different from the last sample bit, the contribution is 0;

(2) at the bit position where the bit pattern changes, for a signal bit "0", if the bit pattern transition is from 0 to 1, the contribution is −1; if the bit pattern transition is from 1 to 0, the contribution is 1;

(3) at the bit position where the bit pattern changes, for a signal bit "1", if the bit pattern transition is from 0 to 1, the contribution is 1; if the bit pattern transition is from 1 to 0, the contribution is −1;

(4) at the extended bit position 0 (or P0), for the value of the extended bit position is opposite to that of the P1, if a signal bit is the same with the P0, the contribution is 0; if the signal bit is different from the P0, the contribution is −1; and (5) at the extended bit position 0 (or P0), for the value of the extended bit position is the same with that of the P1, if a signal bit is the same with the P0, the contribution is −1; if the signal bit is different from the P0, the contribution is 0.

It should be noted that introducing an extended bit position P0 adjacent to the bit position 1 is a way of explaining how to generate a truth table for a sample stream in accordance with the present invention. However, by understanding of the principle of the present invention, the same truth table can be generated for a sample stream without introducing the extended bit position P0.

Figure 4:
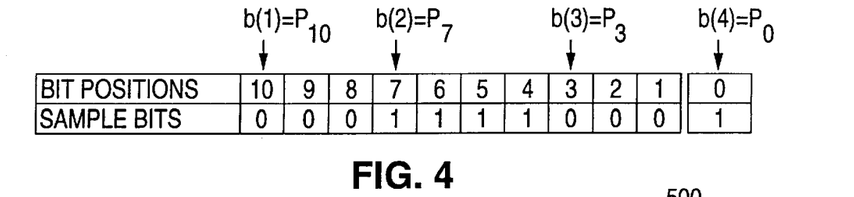
FIG. 4 shows a table, illustrating four boundary positions based on ten sample bits in the sample bit stream shown in FIG. 2, in accordance with the present invention.

Referring to FIG. 4, there is shown a table 400, illustrating 4 boundary positions for a sample stream of ten bits {0001111000}, in accordance with the present invention. The ten sample bits are arranged among ten bit positions: n, n−1, . . . , 2, 1, respectively.

As shown in FIG. 4, an extended bit position P0 (with a value 1) is added. The table 400 contains four boundary positions. Specifically, the first boundary position b(1) is located at the last bit position (P10); the second boundary position b(2) is located at bit position 7 (P7), where the bit pattern is changed from 0 to 1; the third boundary position b(3) is located at bit position 3 (P3), where the bit pattern is changed from 1 to 0; and the fourth boundary position b(4) at the extended bit position bit position (P0). Thus, the contribution adjustments for the ten signal bits {110001110} at a specific time when they are shifted towards their respective ten bit positions are a logic function of the four boundary positions.

Figure 5:
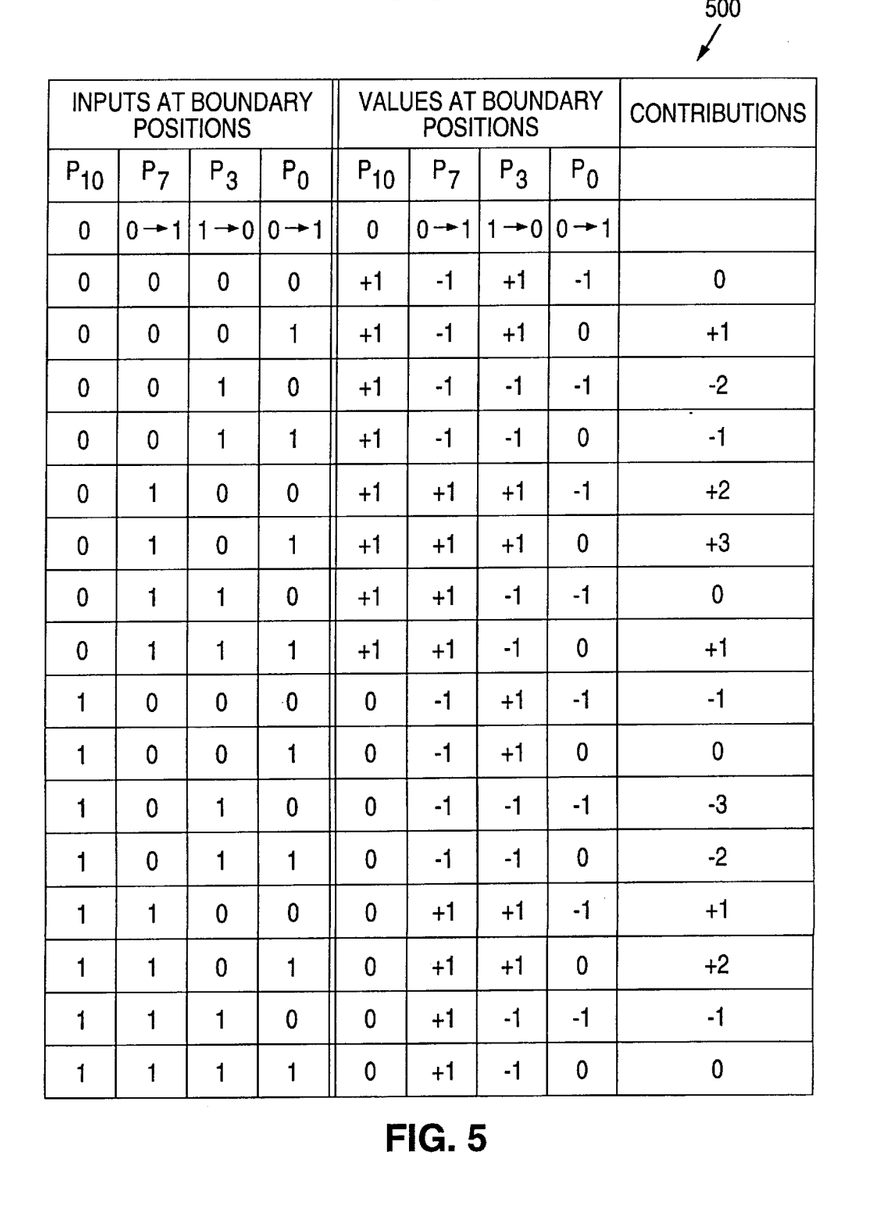
FIG. 5 shows a truth table using the four boundary positions shown in FIG. 4 as inputs, in accordance with the present invention.

Referring to FIG. 5, there is shown a truth table 500 using the four boundary positions (P10, P7, P3, P0) shown in FIG. 4 as inputs, using the rules described above.

It should be noted that the outputs of the truth table 500 reflect the correlation adjustments (or contributions) for the 11 signal bits shifted into the 11 bit positions (P10–0) at a specific time.

Figure 6:
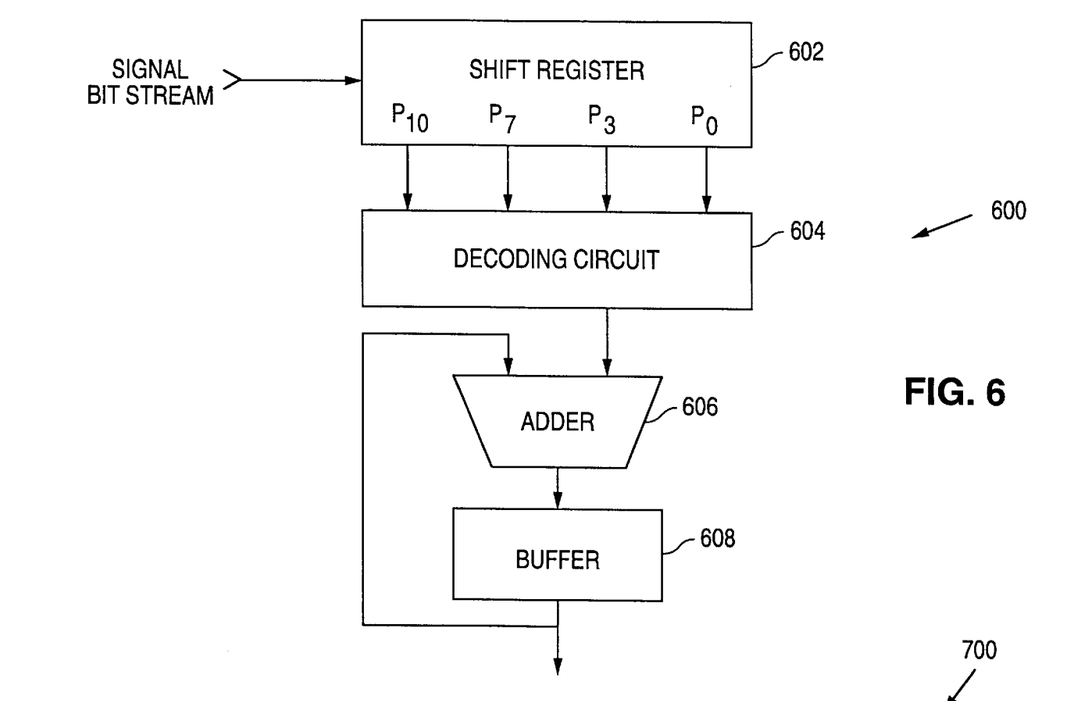
FIG. 6 shows a matched filter using the truth table shown in FIG. 5, in accordance with a first embodiment of the present invention.

Referring to FIG. 6, there is shown a matched filter 600 to generate a sequence of correlations between a signal stream and the sample stream {0001111000} shown in FIG. 4, in accordance with a first embodiment of the present invention.

As shown in FIG. 6, the matched filter 600 includes a shift register 602, a decoding circuit 604, an adder 606, and a buffer 608. Since the sample stream shown in FIG. 4 has ten bits, the shift register 602 has 11 bit positions having four boundary positions (P10, P7, P3, P0). At a specific time, the shift register 602 shifts all the signal bits one bit position right and receives a signal bit at P10. Also, the shift register 602 feeds the signal bits that are shifted into the four boundary positions to the decoding circuit 604. The decoding circuit 604 is designed according to the truth table 500 shown in FIG. 5. Thus, at a specific time k (i.e T(k)), the decoding circuit 604 generates a Contribution (k) for the signal bits that are shifted into the four boundary positions. Accordingly, at time T(k), the correlation C(k) is a combination of Contribution (k) and the correlation at the time k−1. That is, at time k, C(k)=Contribution (k)+C(k−1).

The present invention can be better demonstrated by generating a correlation between a section of signal stream of ten bits {0010011001} and a sample stream of ten bits {0001111000}. Let us assume that at time T(0), that is, at the time before any signal bits in the bit section are shifted into the shift register 602, the register 602 contains 11 bits as {11100001110}. Since the first ten bits in the shift register 602 have a bit pattern opposite to that of the sample stream, the correlation at T(0) should be 0. Thus, let us assume that the correlation C(0) stored in the buffer 608 is 0. Hereinafter at each time T(i), i=1, 2, . . . , 10, when a signal bit in the bit section is shifted into the shift register 602, the decoding circuit 604 generates a Contribution (i) for the signal bits that are shifted into the 4 bit boundary positions. The adder 606 receives the Contribution (i) from the decoding circuit 604 and the C(i−1) from the buffer 608. The adder 606 then generates a correlation C(i) at T(i) by adding the Contribution (i) and C(i−1). That is, C(i)=Contribution (i)+C(i—1). At time T(10), bit section {0010011001} is shifted into the shift register 606; and the correlation C(10) for the bit section is generated in the buffer 608.

According to the truth table 500, the following are the steps of generating Contributions (i) and C(i) at time T(i), i=1, 2, . . . , 10, for the bit section {0010011001} against the sample stream {0001111000}:

At T(1):
Boundary positions in the register 602: 1 (P10), 1 (P7), 0 (P3), 1 (P0)
Contribution (1)=0 (P10)+1 (P7)+1 (P3)+0 (P0)=2 (according to the truth table in FIG. 5)
C(1)=C(0)+Contribution (1)=0+2=2 (store C(1) into the buffer 608)

At T(2):
Boundary positions in the register 602: 0 (P10), 1 (P7), 0 (P3), 1 (P0)
Contribution (2)=1 (P10)+1 (P7)+1 (P3)+0 (P0)=3 (according to the truth table in FIG. 5)
C(2)=C(1)+Contribution (2)=2+3=5 (store C(2) into the buffer 608)

At T(3):
Boundary positions in the register 602: 0 (P10), 1 (P7), 0 (P3), 1 (P0)
Contribution (3)=1 (P10)+1 (P7)+1 (P3)+0 (P0)=3 (according to the truth table in FIG. 5)
C(3)=C(2)+Contribution (3)=5+3=8 (store C(3) into the buffer 608)

At T(4):
Boundary positions in the register 602: 1 (P10), 1 (P7), 0 (P3), 0 (P0)

Contribution (4)=0 (P10)+1 (P7)+1 (P3)−1 (P0)=1 (according to the truth table in FIG. 5)

C(4)=C(3)+Contribution (2)=8+1=9 (store C(4) into the buffer 608)

At T(5):

Boundary positions in the register 602: 1 (P10), 0 (P7), 1 (P3), 0 (P0)

Contribution (5)=0 (P10)−1 (P7)−1 (P3)−1 (P1)=−3 (according to the truth table in FIG. 5)

C(5)=C(4)+Contribution (5)=9−3=6 (store C(5) into the buffer 608)

At T(6):

Boundary positions in the register 602: 0 (P10), 0 (P7), 1 (P3), 0 (P0)

Contribution (6)=1 (P10)−1 (P7)−1 (P3)−1 (P0)=−2 (according to the truth table in FIG. 5)

C(6)=C(5)+Contribution (6)=6−2=4 (store C(6) into the buffer 608)

At T(7):

Boundary positions in the register 602: 0 (P10), 1 (P7), 1 (P3), 0 (P0)

Contribution (7)=1 (P10)+1 (P7)−1 (P3)−1 (P0)=0 (according to the truth table in FIG. 5)

C(7)=C(6)+Contribution (7)=4+0=4 (store C(7) into the buffer 608)

At T(8):

Boundary positions in the register 602: 1 (P10), 1 (P7), 1 (P3), 1 (P0)

Contribution (8)=0 (P10)+1 (P7)−1 (P3)+0 (P0)=0 (according to the truth table in FIG. 5)

C(8)=C(7)+Contribution (8)=4+0=4 (store C(8) into the buffer 608)

At T(9):

Boundary positions in the register 602: 0 (P10), 0 (P7), 0 (P3), 1 (P0)

Contribution (9)=1 (P10)−1 (P7)+1 (P3)+0 (P0)=1 (according to the truth table in FIG. 5)

C(9)=C(8)+Contribution (9)=4+1=5 (store C(9) in the buffer 608)

At T(10):

Boundary positions in the register 602: 0 (P10), 0 (P7), 0 (P3), 1 (P0)

Contribution (5)=1 (P10)−1 (P7)+1 (P3)+0 (PO)=1 (according to the truth table in FIG. 5)

Correlation=C(10)=C(9)+Contribution (10)=5+1=6 (store C(10) into the buffer 608).

Thus, at T(10), the buffer 608 generates a correlation value 6 between the bit section {0010011001} and the sample stream {0001111000}. It should be noted that, in this example at T(0), the initial value in the shift register 602 is {11100001110}. However, for any initial value in the shift register 602, the correlation between the bit section {0010011001} and the sample stream {0001111000} is always 6.

Figure 7:
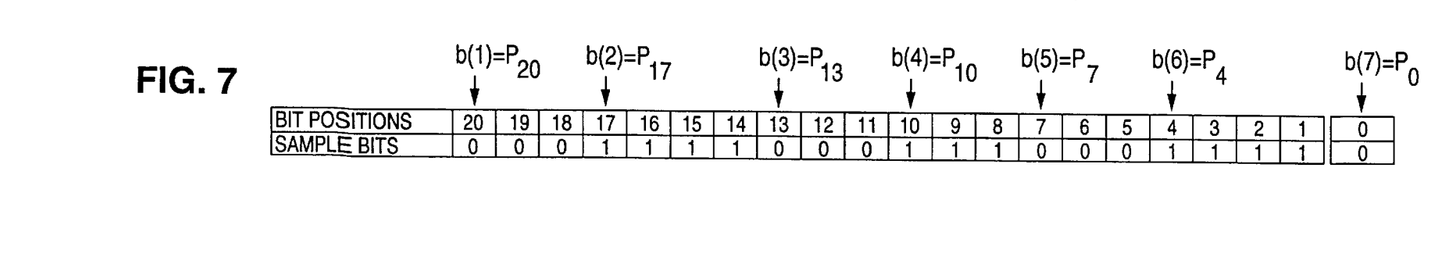
FIG. 7 shows a table containing a same stream of 20 bits, in which seven boundary positions are divided into three groups, in accordance with the present invention.

Referring to FIG. 7, there is shown a table 700 containing a sample stream of 20 sample bits {00011110001110001111} that are arranged in a range of 20 bit positions: 20, 19, . . . , 2, 1, respectively. As shown in FIG. 7, an extended boundary bit position 0 (P0) is added, and the value at the P0 boundary position is 0. Thus, the sample stream contains 7 boundary positions (P20, P17, P13, P10, P7, P4, P0). To reduce the inputs of decoding circuits, the present invention divides the 7 boundary positions into three groups: a first group (P17, P13), a second group (P10, P7), and a third group (P20, P4, P0).

Figure 8:
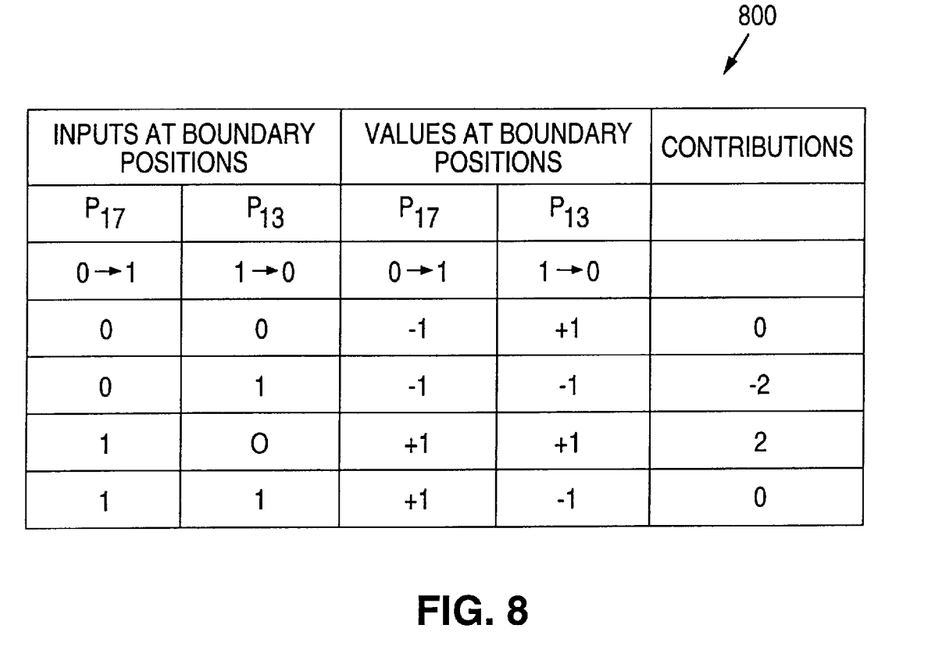
FIG. 8 shows a truth table using the first group boundary positions shown in FIG. 7 as inputs, in accordance with the present invention.

Referring to FIG. 8, there is shown a truth table 800 using the first group boundary positions (P17, P13) as inputs.

Figure 9:
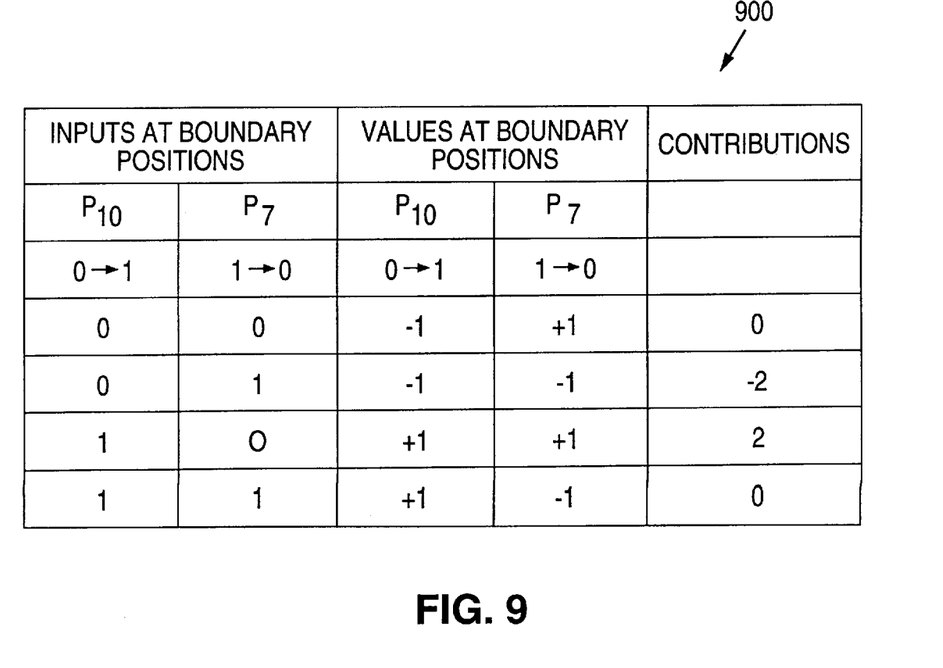
FIG. 9 shows a truth table using the second group boundary positions shown in FIG. 7 as inputs, in accordance with the present invention.

Referring to FIG. 9, there is shown a truth table 900 using the second group boundary positions (P10, P7) as inputs.

Figure 10:
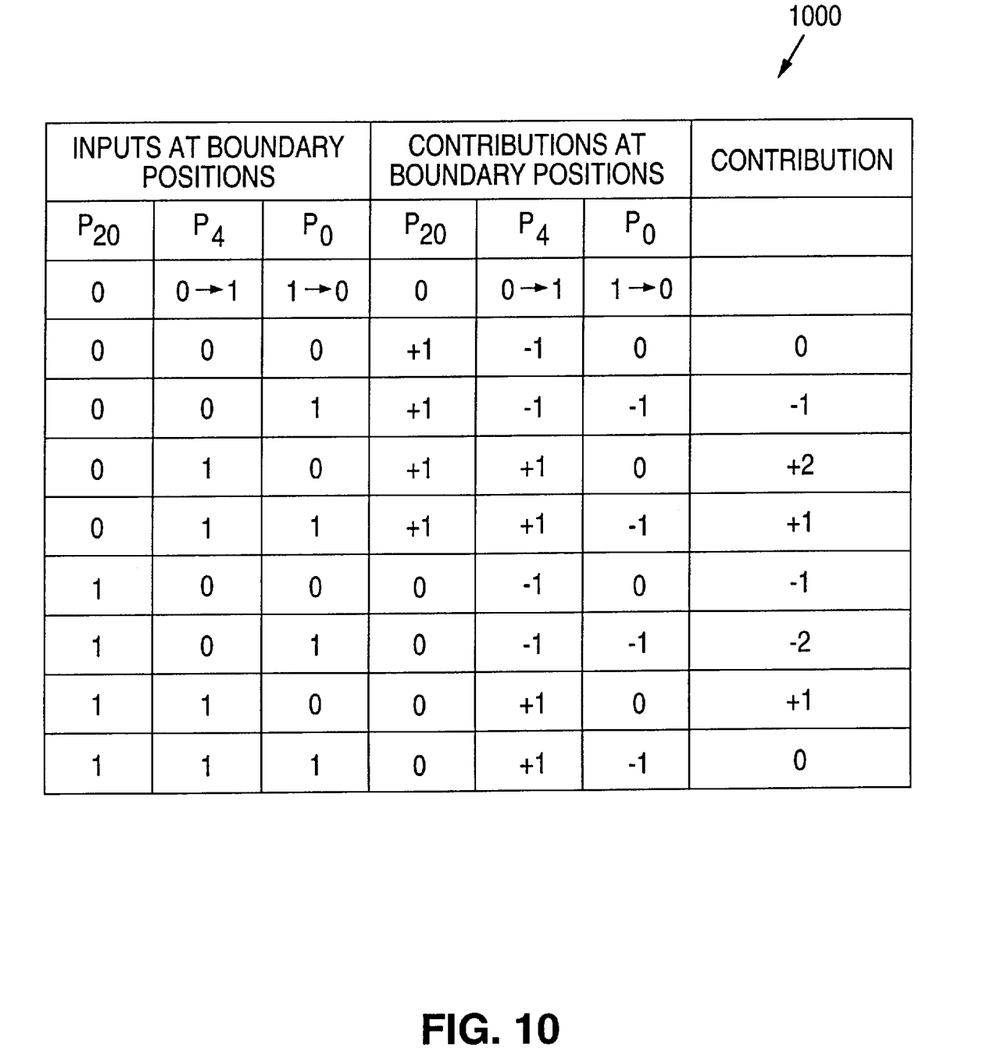
FIG. 10 shows a truth table using the third group boundary positions shown in FIG. 7 as inputs, in accordance with the present invention.

Referring to FIG. 10, there is shown a truth table 1000 using the third group boundary positions (P20, P4, P0) as inputs.

It should be noted that the truth tables 800 and 900 have same values of inputs and outputs, because the first and second group boundary positions have the same bit transition pattern. This can simplify decoding circuit design, because the structures of the decoding circuits for the truth tables 800 and 900 can be the same. For a sample stream of n bits having m groups (m may be a large number), only two different design structures are needed for all decoding circuits.

Figure 11:
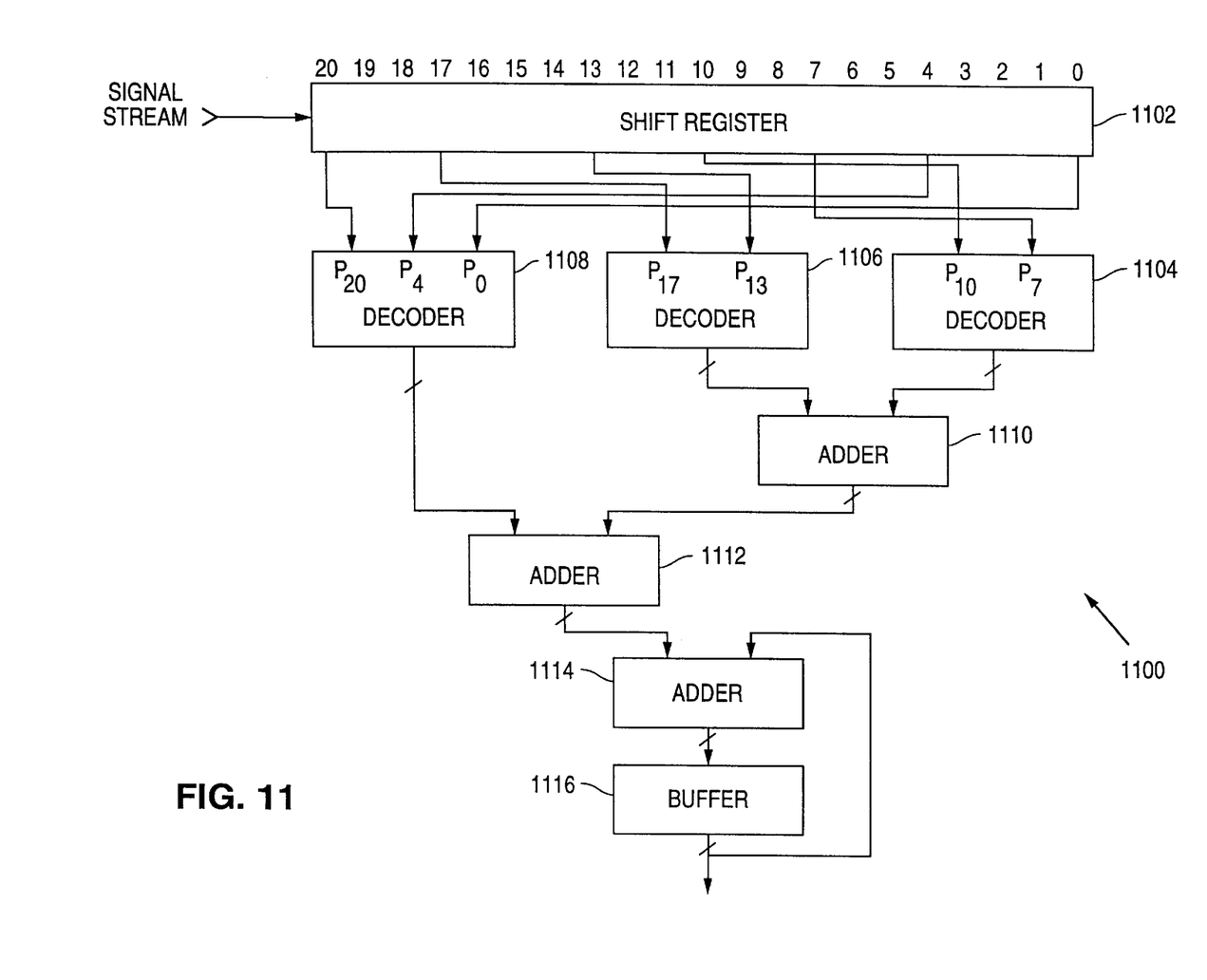
FIG. 11 shows a matched filter using the three truth tables shown in FIGS. 8, 9, and 10, in accordance with a second embodiment of the present invention.

Referring to FIG. 11, there is shown a matched filter 1100 to generate a sequence of correlations between a signal stream and the sample stream {00011110001110001111} shown in FIG. 7, in accordance with a second embodiment of the present invention.

As shown in FIG. 11, the matched filter 1100 includes a shift register 1102, three decoding circuits (1104, 1106, 1108), three adders (1110, 1112, 1114) and a buffer 1116. Since the sample stream shown in FIG. 7 has 20 bits, the shift register 1102 has 21 bit positions including 7 boundary positions (P20, P17, P13, P10, P7, P4, P0).

The shift register 1102 shifts all signal bits one bit position to the right and receives a signal bit at the position 20. Also, the shift register 1102 feeds the signal bits that are shifted into the 7 boundary positions to the three decoding circuits (1104, 1106, 1108). The decoding circuit 1104 is designed according to the truth table 900 shown in FIG. 9. The decoding circuit 1106 is designed according to the truth table 800 shown in FIG. 8. The decoding circuit 1108 is designed according to the truth table 1000 shown in FIG. 10. Since the output value of the three decoding circuits (1104, 1106, 1108) is between −2 and 2, each of the three decoding circuits has an output of 3 bits. The adder 1110 adds the outputs from the decoding circuits 1104 and 1106. Since the output value of adder 1110 is between −4 and 4, the adder 1110 is an 4-bit width adder. The adder 1112 adds the outputs from the decoding circuit 1108 and the adder 1110. Since the output value of adder 1112 is between −6 and 6, the adder 1112 is a 4bit width adder. The adder 1114 adds the outputs from the adder 1112 and the buffer 1116. Since the output value of adder 1114 is between 0 and 20, the adder 1110 is a 5-bit width adder. The buffer 1116 stores the output from the adder 1114.

In operation, at a specific time T(k), when a signal bit is shifted into the shift register 1102, the adder 1112 generates a Contribution (k) for the signal bits that are shifted into the 4 boundary positions. By adding the Contribution (k) with the Correlation (k−1) in the buffer 1116, the adder 1114 generates a Correlation (k).

Referring to Table A listed in Appendix A, there is shown a sample bit stream of 357 bits plus an extended boundary bit position P0.

Referring to Table B listed in Appendix B, there is shown that the sample bit stream in the Table A has 51 boundary bits.

Referring to Table C listed in Appendix C, there is shown that the 51 boundary positions in the Table B can be divided into 25 groups.

Corresponding to the 25 groups of boundary positions, 25 truth tables 1–25 can be created using the inputs from the 25 groups, respectively. The method of creating the truth tables is described above in connection with FIGS. 8–10. As discuses above, the truth tables for groups 1–24 have the same values of inputs and outputs, because the boundary positions in these 24 groups have the same bit transition pattern. This simplifies the design of the decoding circuits.

Figure 12:
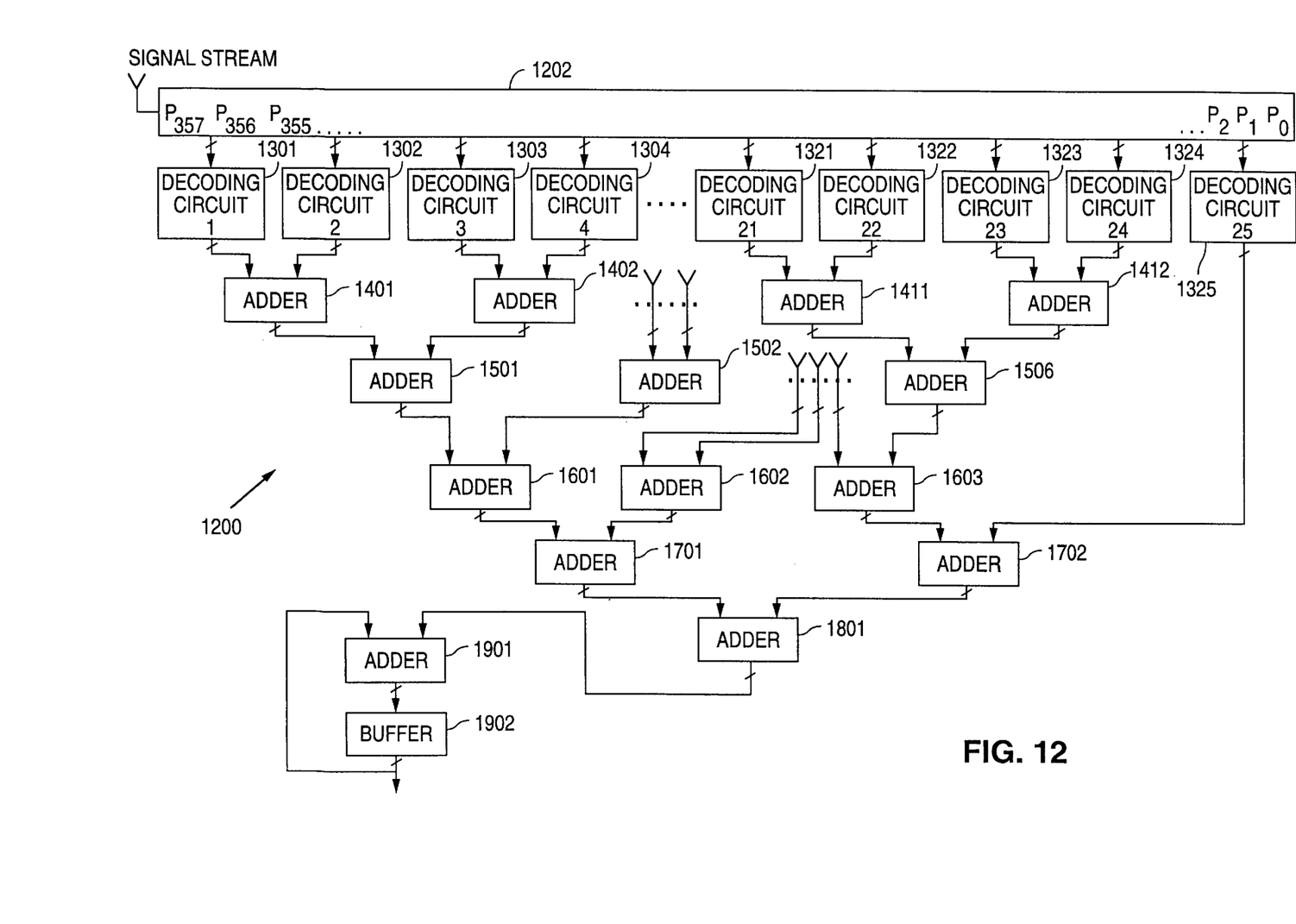
FIG. 12 shows a matched filter, in accordance with a third embodiment of the present invention.

Referring to FIG. 12, there is shown a matched filter 1200 to generate a sequence of correlations between a signal stream and the sample stream shown in FIG. 12, in accordance with a third embodiment of the present invention.

As shown in FIG. 12, the matched filter 1200 includes a shift register 1202, 25 decoding circuits (1301–1325), 12 first layer adders (1401–1412), 6 second layer adders (1501–1506), 3 third layer adders (1601–1603), 2 fourth layer adders (1701, 1702), 1 fifth layer adder 1801, an adder 1901, and a buffer 1902. The shift register 1202 shifts all signal bits one bit position to the right and receives a signal bit at the bit position 357. Also, the shift register 1202 feeds the signal bits that are shifted into the 51 boundary positions to the 25 decoding circuits (1301–1325). The 25 decoding circuits (1301–1325) are designed according to the 25 truth tables for groups 1–25, respectively. At a specific time T(k), adder 1801, in operation together with the adders at the first, second, third, and fourth layers, generates a Contribution (k) for the signal bits that are shifted into the 51 boundary positions. The adder 1901 generates Correlation (k) by adding the Contribution (k) to the Correlation (k−1) stored in the buffer 1902. The Correlation (k) is then stored into the buffer 1902.

While the invention has been illustrated and described in detail in the drawing and foregoing description, it should be understood that the invention may be implemented through alternative embodiments within the spirit of the present invention. Thus, the scope of the invention is not intended to be limited to the illustration and description in this specification, but is to be defined by the appended claims.

APPENDIX A

Table A:
  Sample stream bit position P357=0
  Sample stream bit position P356=0
  Sample stream bit position P355=0
  Sample stream bit position P354=0
  Sample stream bit position P353=0
  Sample stream bit position P352=0
  Sample stream bit position P351=0
  Sample stream bit position P350=0
  Sample stream bit position P349=1
  Sample stream bit position P348=1
  Sample stream bit position P347=1
  Sample stream bit position P346=1
  Sample stream bit position P345=1
  Sample stream bit position P344=1
  Sample stream bit position P343=1
  Sample stream bit position P342=1
  Sample stream bit position P341=1
  Sample stream bit position P340=1
  Sample stream bit position P339=0
  Sample stream bit position P338=0
  Sample stream bit position P337=0
  Sample stream bit position P336=0
  Sample stream bit position P335=0
  Sample stream bit position P334=0
  Sample stream bit position P333=0
  Sample stream bit position P332=0
  Sample stream bit position P331=0
  Sample stream bit position P330=1
  Sample stream bit position P329=1
  Sample stream bit position P328=1
  Sample stream bit position P327=1
  Sample stream bit position P326=1
  Sample stream bit position P325=1
  Sample stream bit position P324=1
  Sample stream bit position P323=1
  Sample stream bit position P322=1
  Sample stream bit position P321=1
  Sample stream bit position P320=1
  Sample stream bit position P319=0
  Sample stream bit position P318=0
  Sample stream bit position P317=0
  Sample stream bit position P316=0
  Sample stream bit position P315=0
  Sample stream bit position P314=0
  Sample stream bit position P313=0
  Sample stream bit position P312=0
  Sample stream bit position P311=0
  Sample stream bit position P310=0
  Sample stream bit position P309=0
  Sample stream bit position P308=1
  Sample stream bit position P307=1
  Sample stream bit position P306=1
  Sample stream bit position P305=1
  Sample stream bit position P304=1
  Sample stream bit position P303=1
  Sample stream bit position P302=1
  Sample stream bit position P301=1
  Sample stream bit position P300=1
  Sample stream bit position P299=1
  Sample stream bit position P298=1
  Sample stream bit position P297=0
  Sample stream bit position P296=0
  Sample stream bit position P295=0
  Sample stream bit position P294=0
  Sample stream bit position P293=0
  Sample stream bit position P292=0
  Sample stream bit position P291=0
  Sample stream bit position P290=0
  Sample stream bit position P289=0
  Sample stream bit position P288=0
  Sample stream bit position P287=0
  Sample stream bit position P286=0
  Sample stream bit position P285=0
  Sample stream bit position P284=1
  Sample stream bit position P283=1
  Sample stream bit position P282=1
  Sample stream bit position P281=1
  Sample stream bit position P280=1
  Sample stream bit position P279=1
  Sample stream bit position P278=1
  Sample stream bit position P277=1

Sample stream bit position P276=1
Sample stream bit position P275=1
Sample stream bit position P274=1
Sample stream bit position P273=1
Sample stream bit position P272=1
Sample stream bit position P271=1
Sample stream bit position P270=0
Sample stream bit position P269=0
Sample stream bit position P268=0
Sample stream bit position P267=0
Sample stream bit position P266=0
Sample stream bit position P265=0
Sample stream bit position P264=0
Sample stream bit position P263=0
Sample stream bit position P262=0
Sample stream bit position P261=0
Sample stream bit position P260=0
Sample stream bit position P259=0
Sample stream bit position P258=0
Sample stream bit position P257=0
Sample stream bit position P256=0
Sample stream bit position P255=0
Sample stream bit position P254=1
Sample stream bit position P253=1
Sample stream bit position P252=1
Sample stream bit position P251=1
Sample stream bit position P250=1
Sample stream bit position P249=1
Sample stream bit position P248=1
Sample stream bit position P247=1
Sample stream bit position P246=1
Sample stream bit position P245=1
Sample stream bit position P244=1
Sample stream bit position P243=1
Sample stream bit position P242=1
Sample stream bit position P241=1
Sample stream bit position P240=0
Sample stream bit position P239=0
Sample stream bit position P238=0
Sample stream bit position P237=0
Sample stream bit position P236=0
Sample stream bit position P235=0
Sample stream bit position P234=0
Sample stream bit position P233=0
Sample stream bit position P232=1
Sample stream bit position P231=1
Sample stream bit position P230=1
Sample stream bit position P229=1
Sample stream bit position P228=1
Sample stream bit position P227=0
Sample stream bit position P226=0
Sample stream bit position P225=0
Sample stream bit position P224=0
Sample stream bit position P223=1
Sample stream bit position P222=1
Sample stream bit position P221=1
Sample stream bit position P220=1
Sample stream bit position P219=1
Sample stream bit position P218=0
Sample stream bit position P217=0
Sample stream bit position P216=0
Sample stream bit position P215=0
Sample stream bit position P214=1
Sample stream bit position P213=1
Sample stream bit position P212=1
Sample stream bit position P211=1
Sample stream bit position P210=1
Sample stream bit position P209=0
Sample stream bit position P208=0
Sample stream bit position P207=0
Sample stream bit position P206=0
Sample stream bit position P205=0
Sample stream bit position P204=1
Sample stream bit position P203=1
Sample stream bit position P202=1
Sample stream bit position P201=1
Sample stream bit position P200=1
Sample stream bit position P199=0
Sample stream bit position P198=0
Sample stream bit position P197=0
Sample stream bit position P196=0
Sample stream bit position P195=0
Sample stream bit position P194=1
Sample stream bit position P193=1
Sample stream bit position P192=1
Sample stream bit position P191=1
Sample stream bit position P190=1
Sample stream bit position P189=0
Sample stream bit position P188=0
Sample stream bit position P187=0
Sample stream bit position P186=0
Sample stream bit position P185=1
Sample stream bit position P184=1
Sample stream bit position P183=1
Sample stream bit position P182=1
Sample stream bit position P181=1
Sample stream bit position P180=0
Sample stream bit position P179=0
Sample stream bit position P178=0
Sample stream bit position P177=0
Sample stream bit position P176=0
Sample stream bit position P175=1
Sample stream bit position P174=1
Sample stream bit position P173=1
Sample stream bit position P172=1
Sample stream bit position P171=1
Sample stream bit position P170=0
Sample stream bit position P169=0
Sample stream bit position P168=0
Sample stream bit position P167=0
Sample stream bit position P166=0
Sample stream bit position P165=0

Sample stream bit position P164=1
Sample stream bit position P163=1
Sample stream bit position P162=1
Sample stream bit position P161=1
Sample stream bit position P160=1
Sample stream bit position P159=0
Sample stream bit position P158=0
Sample stream bit position P157=0
Sample stream bit position P156=0
Sample stream bit position P155=0
Sample stream bit position P154=1
Sample stream bit position P153=1
Sample stream bit position P152=1
Sample stream bit position P151=1
Sample stream bit position P150=1
Sample stream bit position P149=0
Sample stream bit position P148=0
Sample stream bit position P147=0
Sample stream bit position P146=0
Sample stream bit position P145=0
Sample stream bit position P144=0
Sample stream bit position P143=1
Sample stream bit position P142=1
Sample stream bit position P141=1
Sample stream bit position P140=1
Sample stream bit position P139=1
Sample stream bit position P138=1
Sample stream bit position P137=0
Sample stream bit position P136=0
Sample stream bit position P135=0
Sample stream bit position P134=0
Sample stream bit position P133=0
Sample stream bit position P132=1
Sample stream bit position P131=1
Sample stream bit position P130=1
Sample stream bit position P129=1
Sample stream bit position P128=1
Sample stream bit position P127=1
Sample stream bit position P126=0
Sample stream bit position P125=0
Sample stream bit position P124=0
Sample stream bit position P123=0
Sample stream bit position P122=0
Sample stream bit position P121=0
Sample stream bit position P120=1
Sample stream bit position P119=1
Sample stream bit position P118=1
Sample stream bit position P117=1
Sample stream bit position P116=1
Sample stream bit position P115=0
Sample stream bit position P114=0
Sample stream bit position P113=0
Sample stream bit position P112=0
Sample stream bit position P111=0
Sample stream bit position P110=0
Sample stream bit position P109=0

Sample stream bit position P108=1
Sample stream bit position P107=1
Sample stream bit position P106=1
Sample stream bit position P105=1
Sample stream bit position P104=1
Sample stream bit position P103=1
Sample stream bit position P102=0
Sample stream bit position P101=0
Sample stream bit position P100=0
Sample stream bit position P99=0
Sample stream bit position P98=0
Sample stream bit position P97=0
Sample stream bit position P96=1
Sample stream bit position P95=1
Sample stream bit position P94=1
Sample stream bit position P93=1
Sample stream bit position P92=1
Sample stream bit position P91=1
Sample stream bit position P90=0
Sample stream bit position P89=0
Sample stream bit position P88=0
Sample stream bit position P87=0
Sample stream bit position P86=0
Sample stream bit position P85=0
Sample stream bit position P84=0
Sample stream bit position P83=1
Sample stream bit position P82=1
Sample stream bit position P81=1
Sample stream bit position P80=1
Sample stream bit position P79=1
Sample stream bit position P78=1
Sample stream bit position P77=0
Sample stream bit position P76=0
Sample stream bit position P75=0
Sample stream bit position P74=0
Sample stream bit position P73=0
Sample stream bit position P72=0
Sample stream bit position P71=0
Sample stream bit position P70=1
Sample stream bit position P69=1
Sample stream bit position P68=1
Sample stream bit position P67=1
Sample stream bit position P66=1
Sample stream bit position P65=1
Sample stream bit position P64=1
Sample stream bit position P63=0
Sample stream bit position P62=0
Sample stream bit position P61=0
Sample stream bit position P60=0
Sample stream bit position P59=0
Sample stream bit position P58=0
Sample stream bit position P57=0
Sample stream bit position P56=1
Sample stream bit position P55=1
Sample stream bit position P54=1
Sample stream bit position P53=1

Sample stream bit position P52=1
Sample stream bit position P51=1
Sample stream bit position P50=1
Sample stream bit position P49=0
Sample stream bit position P48=0
Sample stream bit position P47=0
Sample stream bit position P46=0
Sample stream bit position P45=0
Sample stream bit position P44=0
Sample stream bit position P43=0
Sample stream bit position P42=0
Sample stream bit position P41=1
Sample stream bit position P40=1
Sample stream bit position P39=1
Sample stream bit position P38=1
Sample stream bit position P37=1
Sample stream bit position P36=1
Sample stream bit position P35=1
Sample stream bit position P34=1
Sample stream bit position P33=0
Sample stream bit position P32=0
Sample stream bit position P31=0
Sample stream bit position P30=0
Sample stream bit position P29=0
Sample stream bit position P28=0
Sample stream bit position P27=0
Sample stream bit position P26=1
Sample stream bit position P25=1
Sample stream bit position P24=1
Sample stream bit position P23=1
Sample stream bit position P22=1
Sample stream bit position P21=1
Sample stream bit position P20=1
Sample stream bit position P19=1
Sample stream bit position P18=1
Sample stream bit position P17=0
Sample stream bit position P16=0
Sample stream bit position P15=0
Sample stream bit position P14=0
Sample stream bit position P13=0
Sample stream bit position P12=0
Sample stream bit position P11=0
Sample stream bit position P10=0
Sample stream bit position P9=1
Sample stream bit position P8=1
Sample stream bit position P7=1
Sample stream bit position P6=1
Sample stream bit position P5=1
Sample stream bit position P4=1
Sample stream bit position P3=1
Sample stream bit position P2=1
Sample stream bit position P1=1
Sample stream bit position P0=1 (The extended boundary bit)

APPENDIX B

Table B:
Boundary position 1=Sample stream bit position 357
Boundary position 2=Sample stream bit position 349
Boundary position 3=Sample stream bit position 339
Boundary position 4=Sample stream bit position 330
Boundary position 5=Sample stream bit position 319
Boundary position 6=Sample stream bit position 308
Boundary position 7=Sample stream bit position 297
Boundary position 8=Sample stream bit position 284
Boundary position 9=Sample stream bit position 240
Boundary position 10=Sample stream bit position 254
Boundary position 11=Sample stream bit position 240
Boundary position 12=Sample stream bit position 232
Boundary position 13=Sample stream bit position 227
Boundary position 14=Sample stream bit position 223
Boundary position 15=Sample stream bit position 218
Boundary position 16=Sample stream bit position 214
Boundary position 17=Sample stream bit position 209
Boundary position 18=Sample stream bit position 204
Boundary position 19=Sample stream bit position 199
Boundary position 20=Sample stream bit position 194
Boundary position 21=Sample stream bit position 189
Boundary position 22=Sample stream bit position 185
Boundary position 23=Sample stream bit position 180
Boundary position 24=Sample stream bit position 175
Boundary position 25=Sample stream bit position 170
Boundary position 26=Sample stream bit position 164
Boundary position 27=Sample stream bit position 159
Boundary position 28=Sample stream bit position 154
Boundary position 29=Sample stream bit position 149
Boundary position 30=Sample stream bit position 143
Boundary position 31=Sample stream bit position 137
Boundary position 32=Sample stream bit position 132
Boundary position 33=Sample stream bit position 126
Boundary position 34=Sample stream bit position 120
Boundary position 35=Sample stream bit position 115
Boundary position 36=Sample stream bit position 108
Boundary position 37=Sample stream bit position 102
Boundary position 38=Sample stream bit position 96
Boundary position 39=Sample stream bit position 90
Boundary position 40=Sample stream bit position 83
Boundary position 41=Sample stream bit position 77
Boundary position 42=Sample stream bit position 70
Boundary position 43=Sample stream bit position 63
Boundary position 44=Sample stream bit position 56
Boundary position 45=Sample stream bit position 49
Boundary position 46=Sample stream bit position 41
Boundary position 47=Sample stream bit position 33
Boundary position 48=Sample stream bit position 26
Boundary position 49=Sample stream bit position 17
Boundary position 50=Sample stream bit position 9
Boundary position 51=Sample stream bit position 0

APPENDIX C

Table C:
Group 1=(P349, P339)
Group 2=(P330, P319)
Group 3=(P308, P297)
Group 4=(P284, P270)

Group 5=(P254, P240)
Group 6=(P232, P227)
Group 7=(P223, P218)
Group 8=(P214, P209)
Group 9=(P204, P199)
Group 10=(P194, P189)
Group 11=(P185, P180)
Group 12=(P175, P170)
Group 13=(P164, P159)
Group 14=(P154, P149)
Group 15=(P143, P137)
Group 16=(P132, P126)
Group 17=(P120, P115)
Group 18=(P108, P102)
Group 19=(P96, P90)
Group 20=(P83, P77)
Group 21=(P70, P63)
Group 22=(P56, P49)
Group 23=(P41, P33)
Group 24=(P26, P17)
Group 25=(P357, P9, P0) (P0 is the extended boundary bit)

What is claimed is:

1. An apparatus for generating a correlation between a sample bit stream of n sample bits An, An−1, . . . , A1 and a section of a signal bit stream of n signal bits Dn, Dn−1, . . . , D1, the apparatus comprising:
   (a) a register having n bit positions n, n−1, . . . , 1, wherein the n bit positions have m boundary positions Ab1, Ab2, . . . , Abm defined by the bit pattern of the sample bit stream, wherein the register shifts the signal bits Dn, Dn−1, . . . , D1 into the register in a sequence of times T(1), T(2), . . . , T(n), so that after n times of shifting, the signal bits Dn, Dn−1, . . . , D1 are shifted into the n bit positions n, n−1, . . . , 1, respectively;
   (b) a circuit for generating a Contribution (i) at time T(i), i=1, 2, . . . , n, for the signal bits that have shifted into the m boundary positions; and
   (c) a circuit for generating a correlation C(i) by combining the Contribution (i) with a correlation C(i−1) generated at T(i−1), wherein i=1, 2, . . . , n.

2. The apparatus of claim 1, further comprising:
   a buffer circuit for storing the correlation C(i−1) generated at T(i−1), and for storing the correlation C(i) generated at T(i).

3. The apparatus of claim 1, wherein some of the m boundary positions correspond to a position in the sample bit stream where a bit pattern is changed from 0 to 1 or from 1 to 0.

4. The apparatus of claim 1, wherein a bit position 0 is added into the register to form a boundary position.

5. The apparatus of claim 1, wherein the bit position n is defined as a boundary position.

6. An apparatus for generating a sequence of correlations for each of the signal bits in a signal stream over a sample bit stream of n sample bits An, An−1, . . . , A1, the apparatus comprising:
   (a) a register, having n bit positions n, n−1, . . . , 1, wherein the bit position n defines an end bit position and the bit position 1 defines a start bit position, wherein the n bit positions have m boundary positions Ab1, Ab2, . . . , Abm defined by the bit pattern of the sample bit stream, wherein the register shifts the n bits stored in the register one bit in a direction towards the start bit position at time T(k), so that the register stores the signal bit in the end bit position;
   (b) a circuit for generating a Contribution (k) at time T(k); and
   (c) a circuit for generating a correlation C(k) by adding the Contribution (k) with a correlation C(k−1) generated at T(k−1).

7. The apparatus of claim 6, further comprising:
   a buffer circuit for storing the correlation C(k−1) generated at T(k−1), and for storing the correlation C(k) generated at T(k).

8. The apparatus of claim 6, wherein some of the m boundary positions correspond to positions in the sample bit stream where a bit pattern is changed from 0 to 1 or from 1 to 0.

9. The apparatus of claim 6, wherein the bit position 0 is an added boundary position.

10. The apparatus of claim 6, wherein the bit position n is defined as a boundary position.

11. An apparatus for generating a correlation between a sample bit stream of n sample bits An, An−1, . . . , A1 and a section in a signal bit stream of n signal bits Dn, Dn−1, . . . , D1, the apparatus comprising:
    (a) a register having n bit positions n, n−1, . . . , 1, wherein the n bit positions have m boundary positions defined by the bit pattern of the sample bit stream, the m boundary positions are divided into k groups Ab1, Ab2, . . . , Abk, wherein the register shifts the signal bits Dn, Dn−1, . . . , D1 into the register in a sequence of times T(1), T(2), . . . , T(n), so that after n times of shifting, the signal bits Dn, Dn−1, . . . , D1 are shifted into the n bit positions n, n−1, . . . , 1, respectively;
    (b) a circuit for generating a group Contribution (i, j) at a time T(i), i=1, 2, . . . , n, j=1, 2, . . . , k, based on one or more signal bits that are shifted into the boundary positions Abj;
    (c) a circuit for generating a Contribution (i) at a time Ti, i=1, 2, . . . , n, by combining C(i, 1), C(i, 2), . . . , C(i, k); and
    (d) a circuit for generating a Correlation (i) at the time by combining the Contribution (i) generated at T(i) with a Correlation (i−1) generated at T(i−1), wherein i=1, 2, . . . , n.

12. The apparatus of claim 11, further comprising:
    a buffer circuit for storing the correlation C(i−1) generated at T(i−1), and for storing the correlation C(i) generated at T(i).

13. The apparatus of claim 11, wherein some of the m boundary positions corresponds to a position in the sample bit stream where a bit pattern is changed from 0 to 1 or from 1 to 0.

14. The apparatus of claim 11, wherein a bit position 0 is added into the register to form a boundary position.

15. The apparatus of claim 11, wherein the bit position n is defined as a boundary position.

16. An apparatus for generating a sequence of correlations for each of the signal bits in a signal stream over a sample bit stream of n sample bits An, An−1. . . , A1, the apparatus comprising:
    (a) a register having n bit positions n, n−1, . . . , 1, wherein the bit position n defines an end bit position and the bit position 1 defines a start bit position, wherein the n bit positions have m boundary positions defined by the bit pattern of the sample bit stream, the m boundary positions are divided into k groups Ab(1), Ab(2), ..., Ab(k), wherein the register shifts the n bits stored in the register one bit in a direction towards the start bit position, so that the register stores the signal bit in the end bit position;

(b) a plurality of circuits for generating a group Contribution (j, i) at a time T(j), based on the bits that are shifted into the boundary positions Ab(i), i=1, 2,..., k;

(c) a circuit for generating a Contribution (j) at a time T(j) by combining C(j, 1), C(j, 2), ..., C(j, k); and (d) a circuit for generating a Correlation (j) at the time T(j) by combining the Contribution (j) generated at T(j) with a Correlation (j−1) generated at T(j−1).

17. The apparatus of claim 16, further comprising:

a buffer circuit for storing the correlation C(j−1) generated at T(j−1), and for storing the correlation C(j) generated at T(j).

18. The apparatus of claim 16, wherein some of the m boundary positions correspond to positions in the sample bit stream where a bit pattern is changed from 0 to 1 or from 1 to 0.

19. The apparatus of claim 16, wherein the bit position 0 in the register is added into the register to form a boundary bit position.

20. The apparatus of claim 16, wherein the bit position n is defined as a boundary position.

21. A method for generating a correlation between a sample bit stream of n sample bits An, An−1, ..., A1 and a section of a signal bit stream of n signal bits Dn, Dn−1, ..., D1, the method comprising the steps of:

arranging the sample bits An, An−1, ..., A1 in n bit positions n, n−1, ..., 1, respectively;

identifying m boundary positions Ab1, Ab2, ..., Abm from the sample bits arranged in the n bit positions;

shifting the signal bits Dn, Dn−1, ..., D1 bit-by-bit into the n bit positions n, n−1, ..., 1, in a sequence of times T(1), T(2), ..., T(n), so that after n times of shifting, the signal bits Dn, Dn−1, ..., D1 are shifted into the n bit positions n, n−1, ..., 1, respectively;

at time T(i), i=1, 2, ..., n, generating a Contribution (i) by comparing the signal bits that are shifted into the m boundary positions with the sample bits that are arranged in the m boundary positions; and at time T(i), i=1, 2, ..., n, generating a correlation C(i) by combining the Contribution (i) generated at T(i) with a correlation C(i−1) generated at T(i−1).

22. The method of claim 21, wherein some of the boundary positions is a bit pattern transition from 0 to 1 or from 1 ro 0.

23. The method of claim 21, an extended boundary position 0 is added into the sample stream.

24. The method of claim 21, wherein the bit position n is defined as a boundary position.

25. A method for generating a sequence of correlations for each of the signal bits in a signal stream over a sample bit stream of n sample bits An, An−1, ..., A1, the method comprising the steps of:

arranging the n sample bits An, An−1, ..., A1 in n bit positions n, n−1, respectively;

storing n signal bits Dn, Dn−1, ..., D1 in the n bit positions n, n−1, ..., 1, respectively, wherein the bit position n defines an end bit position and the bit position 1 defines a start bit position;

identifying m boundary positions Ab1, Ab2, ..., Abm from the n sample bits arranged in the n bit positions;

at a time T(k), shifting the signal bits Dn, On−1, ..., D1 one bit in a direction towards the start bit position so that a newly coming signal bit is shifted into the end bit position;

at the time T(k), generating a Contribution (k) based on signal bits that are shifted into the m boundary positions; and at the time T(K), generating a correlation C(k) by adding Contribution (k) generated at T(k) with a correlation C(k−1) generated at T(k−1).

26. The method of claim 25, wherein some of the boundary positions is a bit pattern transition from 0 to 1 or from 1 ro 0.

27. The method of claim 25, an extended boundary position is added at bit position 0.

28. The method of claim 25, wherein the bit position n is defined as a boundary position.

* * * * *